United States Patent Office 3,570,210
Patented Mar. 16, 1971

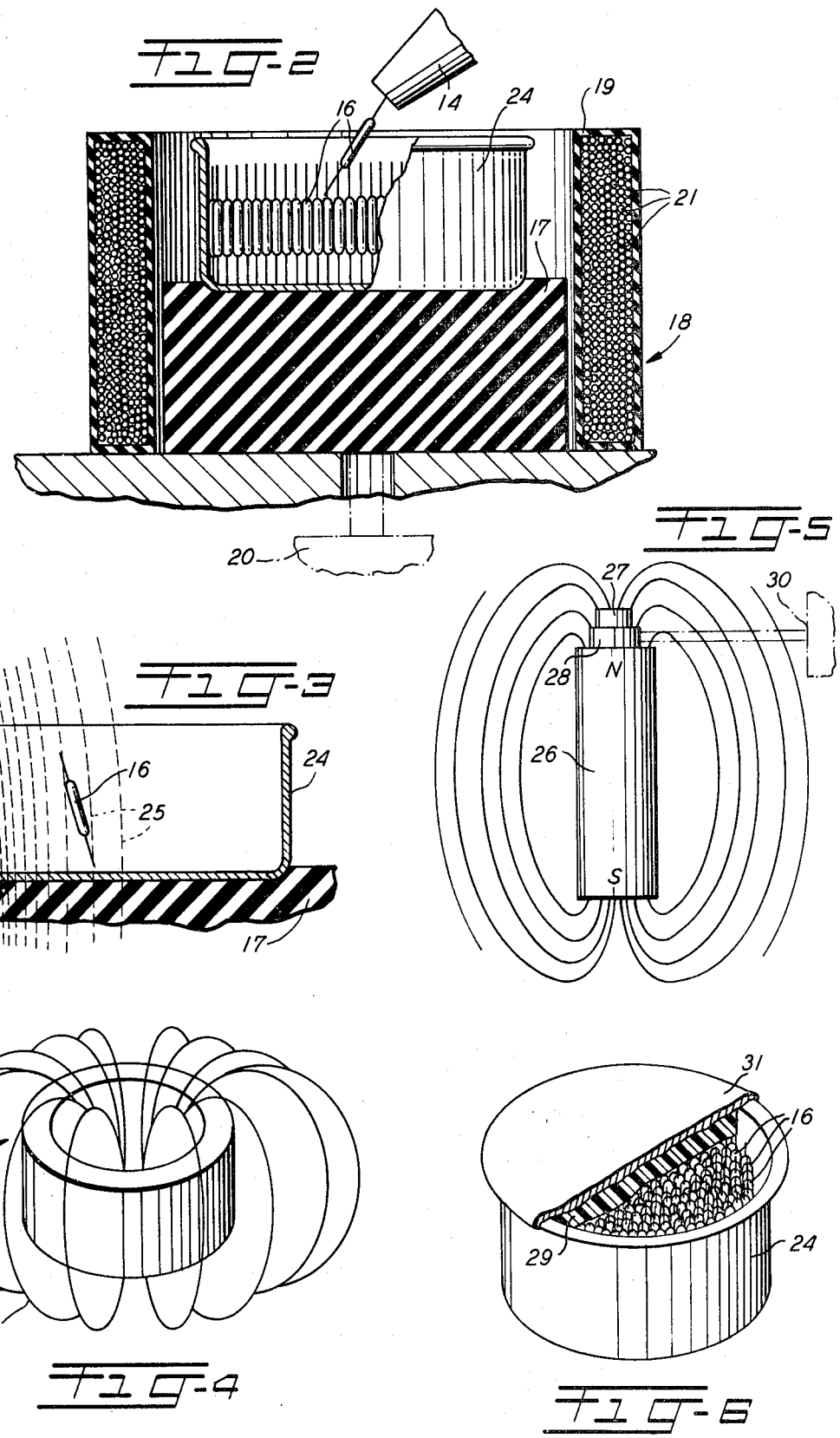

3,570,210
METHOD AND APPARATUS FOR LOADING ELONGATE ARTICLES OF MAGNETIC MATERIAL
Samuel Pinnolis, Winston-Salem, N.C., assignor to Western Electric Company, Incorporated, New York, N.Y.
Filed Apr. 9, 1969, Ser. No. 814,748
Int. Cl. B65b 1/08, 19/39
U.S. Cl. 53—35      9 Claims

ABSTRACT OF THE DISCLOSURE

Elongate articles of a magnetic material, such as dry reed switches, are loaded into a non-magnetic container by placing the container in the center of a funnel-shaped magnetic field such as may be produced by a coil of wire forming an electromagnet. As the electromagnet is excited by an A.C. current, the articles are dropped into the center of the container and the alternating magnetic field (a) aligns the articles vertically within the container, (b) drives the articles toward the walls of the container, and (c) vibrates the articles so that they may be tightly packed.

BACKGROUND OF THE INVENTION

(1) Field of the invention

The invention relates to a method and apparatus for loading and packing elongate articles, such as dry reed switches, resistors, etc., of magnetic material, into a shipping container. In order to prevent damage, certain elongate articles must be packed into containers so that the articles are substantially immobile during shipping. Further, for the sake of manufacturing efficiency, these articles must be packed as rapidly as possible.

(2) Description of the prior art

In the past, a number of different techniques have been used for packing elongate articles, one of which is that of placing the articles a spaced distance apart between two strips of adhesive tape and then laying the folded strips of tape in a container for shipment. Another approach which has been used is that of stacking the loose articles on their sides in a rectangular box and then packing the box tightly with a foam material to prevent movement. In this latter method of packing, a pair of spaced magnetic plates have also been used to align and orient the articles parallel to one another immediately prior to depositing them in the box. Both of these prior methods are relatively slow and therefore expensive as mass production manufacturing operations.

SUMMARY OF THE INVENTION

In one embodiment of the invention, a method and apparatus for loading elongate articles of magnetic material are contemplated wherein magnetic lines of flux are generated to extend between an opening in the container and a receptacle containing the articles to be loaded. The magnetic field serves to align and guide the articles into the container. More particularly, the magnetic field is preferably generally conically-shaped with the more restricted portion nearer the container to effectively funnel the articles into the container and assist movement of the articles toward the outer walls of the container for tight packing. The magnetic field is preferably of the alternating type to impart a vibratory motion to the articles being loaded to increase the density with which the articles may be packed.

BRIEF DESCRIPTION OF THE DRAWING

The nature of the present invention and its various advantages will appear more fully by referring to the following detailed description in conjunction with the appended drawing, in which:

FIG. 2 is a cross-sectional view of FIG. 1 taken through the magnet and container of FIG. 1;

FIG. 3 is a cross-section of the container showing one article and illustrating the manner in which the article is acted upon by magnetic lines of flux;

FIG. 4 is a schematic illustrating the pattern of magnetic lines of flux produced by the magnet of FIG. 1;

FIG. 5 is an illustration of an alternate embodiment of the invention shown in FIG. 1 employing a permanent magnet rather than an electromagnet; and FIG. 6 shows a packed container with a packing disc in place and used to cushion the articles in the filled container during shipment.

DETAILED DESCRIPTION

Figure 1:
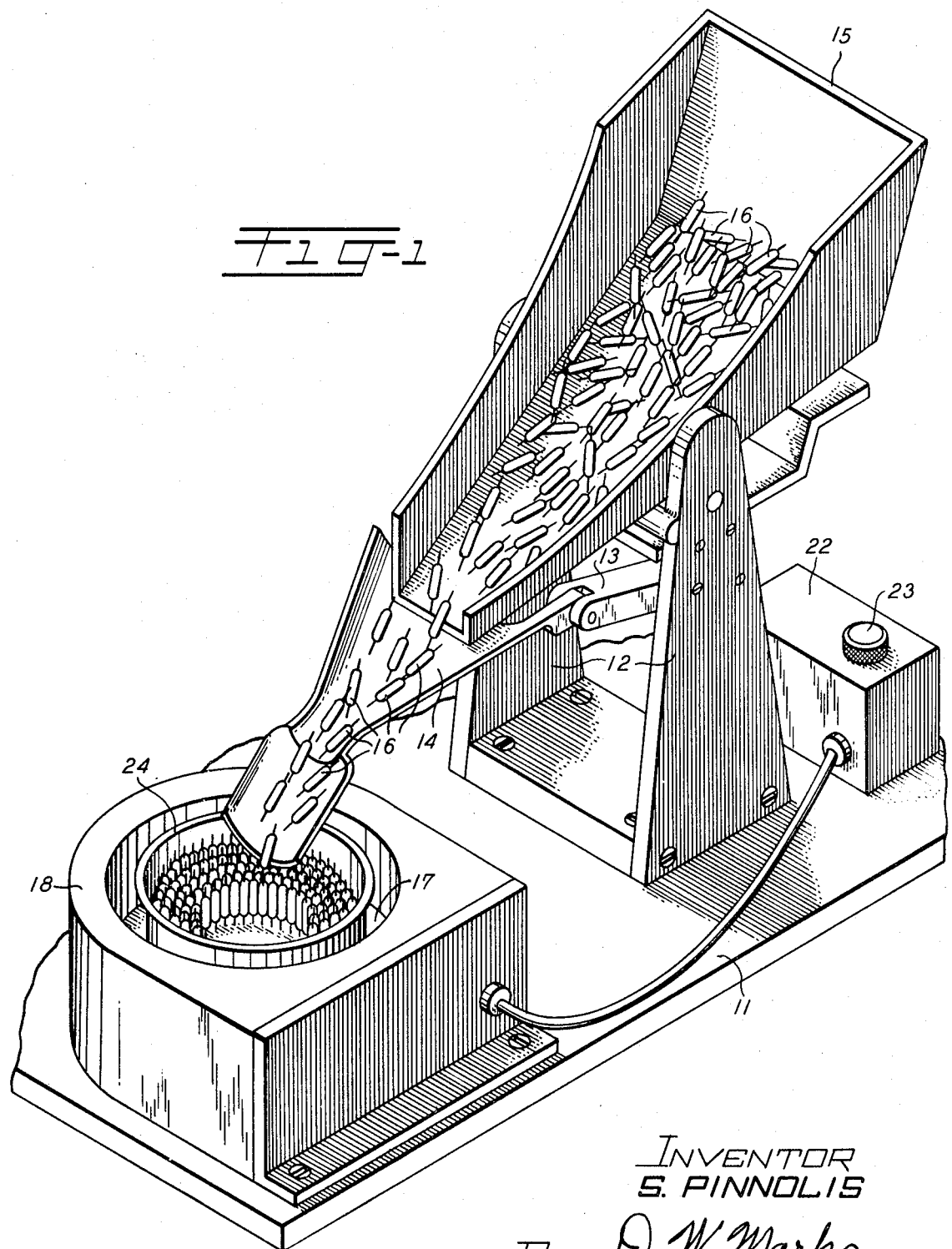
FIG. 1 is a perspective view of an apparatus for loading elongate articles of magnetic material constructed in accordance with the invention.

Referring to FIG. 1, there is illustrated an apparatus for loading elongate articles, such as dry reed switches 16—16, containing elongated members of magnetic material. Other articles, such as diodes, resistors, etc. may be loaded just as easily so long as they contain elongated members of magnetic material which can be oriented by a magnetic field. The apparatus comprises a base 11 upon which is fixed a pair of upstanding support frames 12—12. Mounted to a central portion of the frames 12—12 is a chute support frame 13 having a guide chute 14 fixed to one end thereof. Pivotally mounted to the upper portion of the frames 12—12 is a distribution hopper 15 for containing a supply of randomly oriented dry reed switches 16—16. When the hopper 15 is raised, a number of the switches are delivered to the guide chute 14. The base 11, support frames 12—12, chute support arm 13, chute 14 and hopper 15 are all preferably constructed of a non-magnetic material, such as a phenolic resin, to minimize interference with the magnetic fields, as will be explained below.

Also mounted on the base 11 is a container support platform 17, also of a non-magnetic material, which is positioned directly beneath the discharge end of the chute 14. Surrounding the support platform 17 is an electromagnet 18 comprising a non-magnetic spool 19 (FIG. 2) upon which are wound a plurality of turns of wire 21—21. The ends of the wire are connected to a power supply 22 (FIG. 1) which, when energized by a switch 23, supplies operating current for the electromagnet 18 to generate an alignment and guidance magnetic field. The power supply 22 may provide either direct or alternating current although, as will be pointed out below, alternating current is preferable. A cylindrical container 24 of non-magnetic material, such as aluminum or cardboard, is positioned upon the support platform 17 in alignment with the discharge end of the chute 14. As switches 16—16 to be loaded are delivered to the end of the chute 14, the articles are aligned vertically in the container 22 and packed tightly therein for shipment.

To begin the loading operation, the electromagnet 18 is energized by an alternating current which may be conventional 60 Hz. line current. The magnetic field which is generated by current flowing through the coils of wire 21—21 of the electromagnet 18 forms lines of flux around the coils and through the non-magnetic container 24 somewhat similar to those illustrated in FIGS. 3 and 4.

The flux lines 25 form a funnel-like configuration (FIG. 4) near the open ends of the electromagnet 18 and pass vertically through the bottom of the container 24 (FIG. 3) since the bottom is located on a plane at approximately the center of the electromagnet 18. Since the container 24 is spaced slightly above the center of the electromagnet 18 by the raised bottom portion of the support platform 17, the lines of flux comprising the alignment and guidance field are substantially parallel to the walls of the container; however, as shown in FIG. 3, the field is actually slanted slightly outwardly toward the upper edges of the container and increases in intensity toward the edge of the container 24, which is closer to the inside surface of the magnet 18.

As the switches 16—16 are dumped from the chute 14, into the center of the container 24, they are randomly oriented. However, as they leave the end of the chute 14, they align themselves parallel wtih the magnetic lines of flux 24 and therefore stand endwise upon the bottom of the container. As the switches 16—16 strike the bottom of the container, they tend to move toward the outside walls of the container. It is believed that this movement is due to the combined effects of (1) the magnetic field inducing the creation of north and south poles at the same respective ends of each of the switches 16—16 which poles repel one another, and (2) the switches being drawn toward the area of highest magnetic field intensity which is nearer the walls of the container. Further, as is best shown in FIG. 3, since the magnetic field is slanted slightly outwardly, the switches 16—16 tend to lean toward the walls of the container 24 as they are moving in that direction. This allows more switches to enter the center of the container and hence a higher packing density of switches in the container.

As was mentioned above, an alternating current is preferably used to excite the electromagnet 18 because the alternating magnetic field also causes the switches to vibrate as they are loaded so that the final few switches are jiggled into place and the container is very tightly packed. A D.C. field may be used in combination with a mechanical vibrator attached to the platform 17 to achieve the same result or a mechanical vibrator 20 can be used to provide supplementary oxalation with the A.C. field.

Although the invention has been illustrated with an electromagnet being used to generate the alignment and guidance field, a permanent magnet might also be used for this purpose. As is shown in FIG. 5, a cylindrical permanent magnet 26 having a diameter larger than that of the container 27 to be packed, and of a length sufficient to provide lines of flux substantially parallel to the walls of a container 27 placed adjacent one of the ends on a raised non-magnetic platform 28 may be used. The lines of flux passing through the container due to the permanent magnet 26 would be similar to those supplied by the electromagnet 18 shown in FIG. 2. A very wide, flat permanent magnet has also been found to work effectively to provide an orientation flux field as long as the container is kept near the center of the magnet to avoid the fringing effects near the edges. A mechanical vibrator 30 could also be provided with the permanent magnet orientor to jiggle the container 27 and insure a high packing density of articles within the container.

FIG. 6 illustrates a container 24 filled to capacity by tightly packed, vertically oriented, elongate magnetic articles having a disc-like polyurethane foam slug 29 placed between the upper ends of the articles and a lid 31 which is used to close the top of the container to insure safe transport.

What is claimed is:

1. An apparatus for loading elongate articles of magnetic material into a non-magnetic container comprising:
   a coil of wire having an opening through the center thereof large enough to accommodate said container;
   means for supporting said container within the opening in said coil;
   a receptacle for receiving a plurality of said articles, said receptacle having a dispensing opening spaced from and in alignment with said container; and
   means for applying an electrical current to said coil to generate a magnetic flux directed into said container, the direction of said flux being substantially perpendicular to the bottom of said container and parallel to the walls of said container to guide said articles from the dispensing opening of said receptacle into said container.

2. An apparatus for loading elongate articles of magnetic material into a container as set forth in claim 1, wherein:
   said electrical current is of the alternating type to impart a vibratory motion to the articles being loaded into said container to increase the density with which said articles may be packed.

3. An apparatus for loading elongate articles of magnetic material into a container as set forth in claim 1, also including:
   means for mechanical vibrating said container to facilitate the packing of said articles into said container.

4. An apparatus for loading elongate articles of magnetic material into a container, comprising:
   means for supporting said container;
   a receptacle for receiving a plurality of said articles, said receptacle having a dispensing opening spaced from and in alignment with an opening in said container; and
   means for generating a generally conically-shaped pattern of magnetic flux directed between the dispensing opening in said receptacle and the opening in said container, the more restricted section of said generally conical flux pattern being nearer said receptacle to guide articles from the dispensing opening in said receptacle into a central portion of said container.

5. An apparatus for loading elongate articles of magnetic material into a container, as set forth in claim 4, wherein said means for generating a magnetic flux pattern comprises:
   a coil of wire and means for applying electrical current to said coil.

6. An apparatus for loading articles having elongate members of magnetic material into a cylindrical non-magnetic container having an opening at one end, comprising:
   a magnetic coil including a plurality of turns of wire, said coil having an axial opening therethrough large enough in diameter to receive said cylindrical container;
   means for supporting said container within the axial opening of said coil to maintain the closed end of said cylindrical container in a plane approximately perpendicular to the axis of said coil at equal distances from the ends of said axial opening;
   a receptacle for receiving a plurality of said articles, said receptacle having a dispensing opening spaced from and in alignment with a central portion of said cylindrical container; and
   means for applying an electric current to the wires of said coil to generate a generally conically-shaped pattern of magnetic flux extending from the dispensing opening of said container into the open end of said cylindrical container and through the closed end of said cylindrical container, said lines of flux being approximately parallel to the walls of said cylindrical container and perpendicular to the closed end of said cylindrical container to align and guide articles dispensed from said receptacle into said container.

7. A method of loading elongate articles of magnetic material into a container, comprising:
   supporting a container having an opening therein spaced from and in alignment with a receptacle for receiving a plurality of said articles, said receptacle having a dispensing opening therein in alignment with an opening in said container;

generating a generally conical pattern of magnetic flux wherein the lines of flux extend between the dispensing opening in said receptacle and the opening in said container to form a transfer path for articles to be loaded from said receptacle into said container; and passing articles from the receptacle through the dispensing opening into the opening in the container.

8. A method of loading elongate articles of magnetic material into a container, as set forth in claim 7, wherein:
the pattern of magnetic flux is more dense near the periphery of said container than near the center of said container to attract articles toward the periphery of said container and enable a denser packing of said articles.

9. A method of loading elongate articles of magnetic material into a container, as set forth in claim 7 wherein:
said magnetic field is of the alternating type to impart a vibratory motion to said articles to increase the density with which said articles may be packed.

References Cited

UNITED STATES PATENTS

| | | | |
|---|---|---|---|
| 1,330,113 | 2/1920 | Gamper | 53—236X |
| 2,899,783 | 8/1959 | Otto | 53—236X |
| 3,445,987 | 5/1969 | Likhachev et al. | 53—236X |
| 3,473,287 | 10/1969 | Littwin | 53—35 |

TRAVIS S. McGEHEE, Primary Examiner

E. F. DESMOND, Assistant Examiner

U.S. Cl. X.R.

53—236